United States Patent
Okayama

(10) Patent No.: US 8,351,078 B2
(45) Date of Patent: Jan. 8, 2013

(54) IMAGE FORMING APPARATUS AND IMAGE READING SIZE SETTING METHOD

(75) Inventor: Noritsugu Okayama, Kawasaki (JP)

(73) Assignee: Canon Kabushiki Kaisha (JP)

( * ) Notice: Subject to any disclaimer, the term of this patent is extended or adjusted under 35 U.S.C. 154(b) by 875 days.

(21) Appl. No.: 12/486,043

(22) Filed: Jun. 17, 2009

(65) Prior Publication Data

US 2009/0310162 A1 Dec. 17, 2009

(30) Foreign Application Priority Data

Jun. 17, 2008 (JP) ................................ 2008-158554

(51) Int. Cl.
*G06F 15/00* (2006.01)
(52) U.S. Cl. ......... 358/1.9; 358/1.1; 358/444; 358/1.16; 358/524; 358/474; 358/453; 358/448
(58) Field of Classification Search .................. None
See application file for complete search history.

(56) References Cited

U.S. PATENT DOCUMENTS 7,307,762 B2 * 12/2007 Yaguchi ........................ 358/444
7,505,182 B2 * 3/2009 Suzuki et al. ................. 358/474

FOREIGN PATENT DOCUMENTS

JP 11-202689 A 7/1999

* cited by examiner

*Primary Examiner* — Benny Q Tieu
*Assistant Examiner* — Paul F Payer
(74) *Attorney, Agent, or Firm* — Rossi, Kimms & McDowell LLP

(57) ABSTRACT

There is provided an image forming apparatus and a control method for the same in which the reading size for an original is controlled according to various executing conditions while troublesome operations for a user are reduced. To accomplish this, at the time of reading an original, the image forming apparatus confirms a pre-registered executing condition and sets the reading size for the original according to the executing condition. Specifically, if an appropriate original size is pre-registered, that original size is set as the reading size for the original. Even if the original size is not pre-registered by the user, an original size entered with minimum user operations required of the user is set as the reading size.

7 Claims, 8 Drawing Sheets

IMAGE FORMING APPARATUS AND IMAGE READING SIZE SETTING METHOD

BACKGROUND OF THE INVENTION

1. Field of the Invention

The present invention relates to an image forming apparatus such as a copier, printer, or facsimile, and a control method and computer program for the same.

2. Description of the Related Art

In an image forming apparatus having a function of reading an original, what is called ACS (Automatic Color Selection) processing is executed for automatically determining whether an original is color or monochrome. For example, Japanese Patent Laid-Open No. 11-202689 proposes a technique of registering paper feed cassettes for use in executing the automatic monochrome-color determination. There is also an image forming apparatus with a sensor for detecting, in order to read an appropriate range, the size of an original that a user wants to be read.

However, the following problems exist in related art. For example, in an image forming apparatus having insufficient memory and hardware resources, it is difficult to execute the ACS processing by storing an image in the memory and then analyzing the stored image. It is necessary to read an original and at the same time to execute the monochrome-color determination based on read image data. Therefore, in order to increase the accuracy of the ACS processing, scanning an appropriate reading range without reading the outside or edges of the original is required.

However, in a low-priced image forming apparatus without a sensor for detecting the size of an original, the execution of the ACS processing for an appropriate range of an original has been difficult. Therefore, in order to scan an appropriate range of an original, it has been necessary to cause a user to enter the size of the original every time before reading. Even when the ACS processing is not executed, the range of an original needs to be appropriately recognized depending on various executing conditions of reading processing. For example, if read data is to be transmitted to an external facsimile apparatus, an original needs to be read in a size specific to facsimile transmission. Thus, in the conventional art, it has been necessary for the user to enter the reading size for an original corresponding to various executing conditions. Operations for this are troublesome for the user and have caused a reduced operability.

SUMMARY OF THE INVENTION

The present invention enables realization of an image forming apparatus and a control method for the same in which the reading size for an original is controlled according to various executing conditions while troublesome operations for a user are reduced.

One aspect of the present invention provides an image forming apparatus comprising a reading unit that reads an original and a color determination unit that executes a color determination process for determining whether the original is monochrome or color from read data, the image forming apparatus comprising: a registration unit that registers an executing condition for reading the original; a confirmation unit that confirms the executing condition; and a setting unit that sets a registered original size as a reading size for reading the original if the executing condition confirmed by the confirmation unit designates execution of the color determination process and an original size is registered, and sets a size of a printing material used for image printing as the reading size if the executing condition designates the execution of the color determination process and the original size is not registered, or if the executing condition does not designate the execution of the color determination process.

Another aspect of the present invention provides an image forming apparatus comprising a feeding unit that feeds an original, an original detection sensor that detects the presence or absence of an original set on the feeding unit, a reading unit that reads the original, and a transmission unit that transmits read data to an external apparatus, the image forming apparatus comprising: a registration unit that registers an executing condition for reading the original and for transmitting the read data to the external apparatus; a confirmation unit that confirms the executing condition; and a setting unit that sets a registered original size as a reading size for reading the original if the original detection sensor detects the original set on the feeding unit and the executing condition confirmed by the confirmation unit does not designate a facsimile machine as a destination, and sets a defined size for facsimile transmission as the reading size if the original detection sensor detects the original set on the feeding unit and the executing condition confirmed by the confirmation unit designates a facsimile machine as the destination, and prompts an operator to enter the original size and sets the entered original size as the reading size if the original detection sensor does not detect the original set on the feeding unit.

Still another aspect of the present invention provides a control method for an image forming apparatus comprising a reading unit that reads an original and a color determination unit that executes a color determination process for determining whether the original is monochrome or color from read data, the method comprising: registering an executing condition for reading the original; confirming the executing condition; and setting a registered original size as a reading size for reading the original if the executing condition confirmed in the confirming designates execution of the color determination process and an original size is registered, and setting a size of a printing material used for image printing as the reading size if the executing condition designates the execution of the color determination process and the original size is not registered, or if the executing condition does not designate the execution of the color determination process.

Yet another aspect of the present invention provides a control method for an image forming apparatus comprising a feeding unit that feeds an original, an original detection sensor that detects the presence or absence of an original set on the feeding unit, a reading unit that reads the original, and a transmission unit that transmits read data to an external apparatus, the method comprising: registering an executing condition for reading the original and for transmitting the read data to the external apparatus; confirming the executing condition; and setting a registered original size as a reading size for reading the original if the original detection sensor detects the original set on the feeding unit and the executing condition confirmed in the confirming does not designate a facsimile machine as a destination, and setting a defined size for facsimile transmission as the reading size if the original detection sensor detects the original set on the feeding unit and the executing condition designates a facsimile machine as the destination, and prompting an operator to enter the original size and setting the entered original size as the reading size if the original detection sensor does not detect the original placed on the feeding unit.

Still yet another aspect of the present invention provides a computer-readable storage medium storing a computer program that causes a computer to perform the steps of the control method for the image forming apparatus.

Further features of the present invention will be apparent from the following description of exemplary embodiments with reference to the attached drawings.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

In an image forming apparatus according to the present invention, the reading size for reading an original is set based on registered executing conditions to improve user operability and to perform accurate reading processing. The executing conditions herein refer to at least one of the following conditions: the location at which the original is placed, whether or not to execute a color determination process at the time of reading, a registered original size and paper size, and how to process image data read from the original.

First Embodiment

Figure 1:
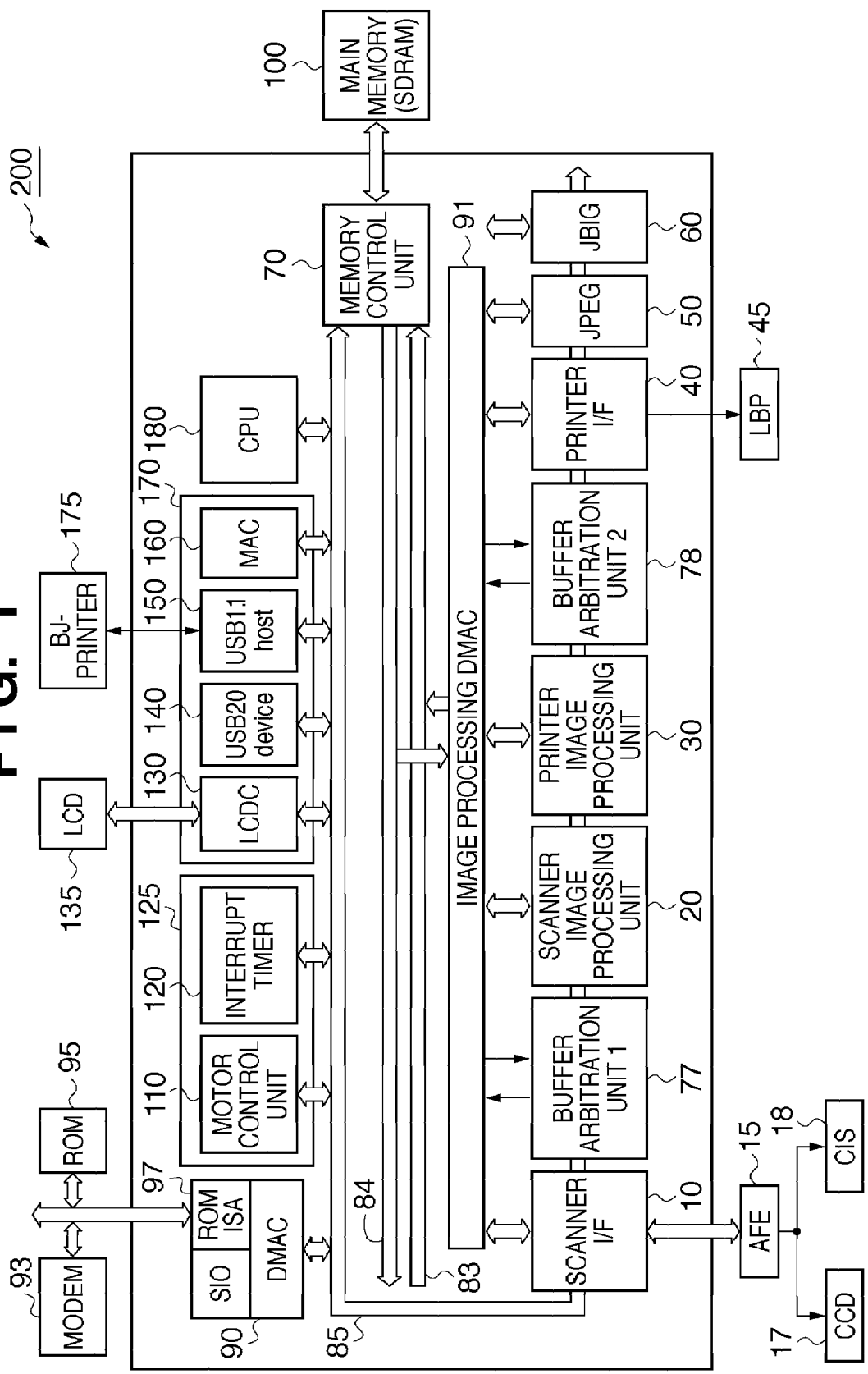
FIG. 1 is a block diagram showing an exemplary schematic configuration of an image forming apparatus according to a first embodiment.

A first embodiment will be described below with reference to FIGS. 1 to 4. FIG. 1 is a block diagram showing an exemplary schematic configuration of the image forming apparatus according to the first embodiment. A CCD 17 and a CIS 18 are connected to a scanner interface (hereinafter referred to as a "scanner I/F") 10 via an analog front end (AFE) 15. In this manner, their read data can be taken into the image forming apparatus 200 without the intervention of individual dedicated circuits. Data processing of the scanner I/F 10 will be described in detail later.

A scanner image processing unit 20 performs image processing according to an image processing operation mode (color scan, monochrome scan, or the like) for image data developed by the processing of the scanner I/F 10 in a main memory 100. Details of the scanner image processing unit 20 will be described later.

A printer image processing unit 30 is a processing unit for performing area edition and resolution conversion for an input image and outputting resulting image data through a printer. An LBP interface (I/F) 40 outputs the image processing result to a connected laser beam printer (LBP) 45. The LBP 45 prints an image on paper according to the input image processing result.

A buffer arbitration unit 77 arbitrates data write/read when data is sent and received between the scanner I/F 10 and the scanner image processing unit 20 via a ring buffer area in the main memory 100. A buffer arbitration unit 78 arbitrates data write/read when data is sent and received between the printer image processing unit 30 and the LBP interface 40 via a ring buffer area in the main memory 100. Since the buffer arbitration units 77 and 78 have the same basic configuration, they may be implemented as one block. However, the buffer arbitration units 77 and 78 are described here as separate blocks because they are controlled in different manners depending on the purpose of use.

A JPEG module 50 and a JBIG module 60 are processing units that perform image data compression and decompression processing in compliance with standards for the respective formats. Color image data is processed in the JPEG module 50, and monochrome image data is processed in the JBIG module 60. A memory control unit 70 is connected with buses 83 and 84 of an image processing system and with a bus 85 of a computer system, and controls data transfer for writing/reading data to/from the main memory (SDRAM) 100.

A DMA controller (DMAC) 90 cooperates with the memory control unit 70 and is connected to a ROM 95 via a ROM ISA 97. The DMA controller 90 generates and sets address information needed for DMA control with respect to sending/receiving data that external devices and various interface units 170 send to and receive from the main memory 100.

An image processing DMAC 91 cooperates with the memory control unit 70 to generate and set address information needed for DMA control with respect to sending/receiving data that the image processing units (10, 20, 30, and 40) send to and receive from the main memory 100. For example, depending on the type of an image reading device, for example whether the CCD 17 or the CIS 18, address information for DMA-transferring image data read by the scanner I/F 10 to the main memory 100 is generated for each DMA channel.

Also, address information for reading out image data developed in the main memory 100 is generated depending on a DMA channel, and DMA-transferred to the scanner image processing unit 20. In this manner, the image processing DMAC 91 functions as a unit responsible for the DMA control between the main memory 100 and the image processing units (10, 20, 30, and 40) in cooperation with the memory control unit 70.

The ROM 95 stores control parameters and control program data corresponding to image reading devices (such as the CCD 17 and the CIS 18), where the control parameters and the like can be set variously according to the image reading devices. This enables input processing of image data in compliance with individual data output forms of the CCD 17 and the CIS 18, thereby eliminating the need to provide dedicated interface circuits. The ROM 95 may also store programs to be loaded into the main memory 100 and executed by the CPU 180.

The bus 83 sends data read out from the main memory 100 to the processing units (10 to 60) of the image processing system. The bus 84 sends data read out from the processing units (10 to 60) of the image processing system to the main memory 100. The buses 83 and 84 operate in a pair for sending/receiving image data between the image processing block and the main memory 100. The bus 85 is a bus of the computer system to which a CPU 180, the communication and interface units 170, a mechatronics system control unit 125, a control register for the image processing units, and the DMAC 90 connect.

The mechatronics system control unit 125 includes a motor control unit 110, and an interrupt timer control unit 120 responsible for timing control for controlling motor driving timing and for controlling tuning of processing of the image processing system. The interface units 170 include an LCD control unit 130, USB interfaces 140 and 150, and a media access control unit 160 as various user interfaces.

The LCD control unit 130 is a unit responsible for display control for displaying various settings, processing statuses, and the like of the image forming apparatus on an LCD 135. The USB interfaces 140 and 150 enable connections with peripheral devices. In the example shown in FIG. 1, a BJ-printer 175 is shown to be connected. The media access control (MAC) unit 160 is a unit that controls the timing for sending data to connected devices (i.e., access) and the like.

The CPU 180 centrally controls the image forming apparatus 200. For this purpose, the CPU 180 loads programs from the ROM 95 into the main memory 100 and performs corresponding control.

The scanner I/F 10 can support the CCD 17 and the CIS 18 as image reading devices and performs input processing for signals from both image reading devices. Image data that is input here is DMA-transferred and developed in the main memory 100 by the memory control unit 70.

Figure 2:
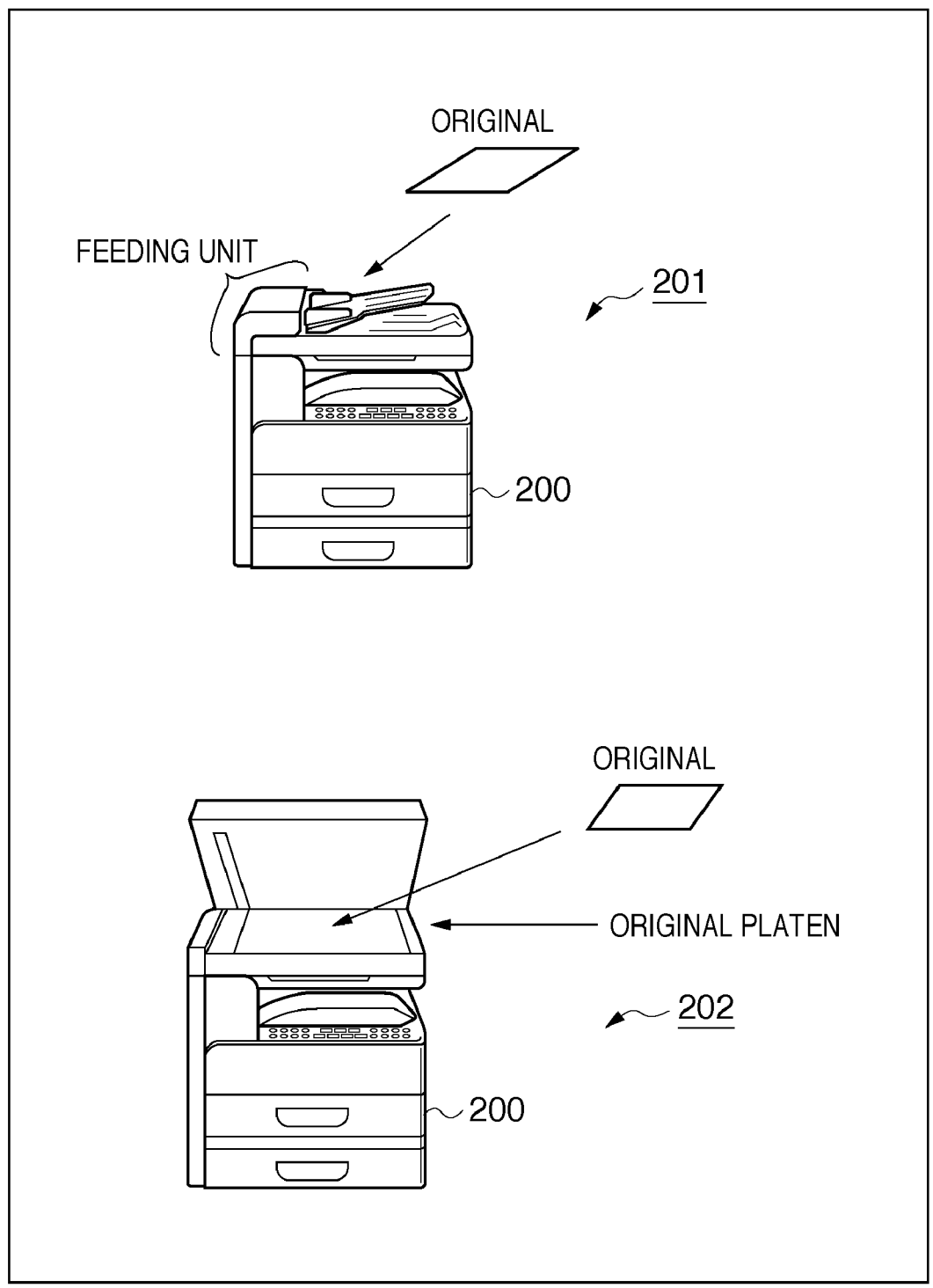
FIG. 2 is a perspective view showing the appearance of the image forming apparatus according to the first embodiment.

FIG. 2 is a perspective view showing the appearance of the image forming apparatus according to the first embodiment. As shown at 201, the image forming apparatus 200 can convey an original placed on a feeding unit and scan the original. As shown at 202, the image forming apparatus 200 can also scan an original placed on an original platen.

Figure 3:
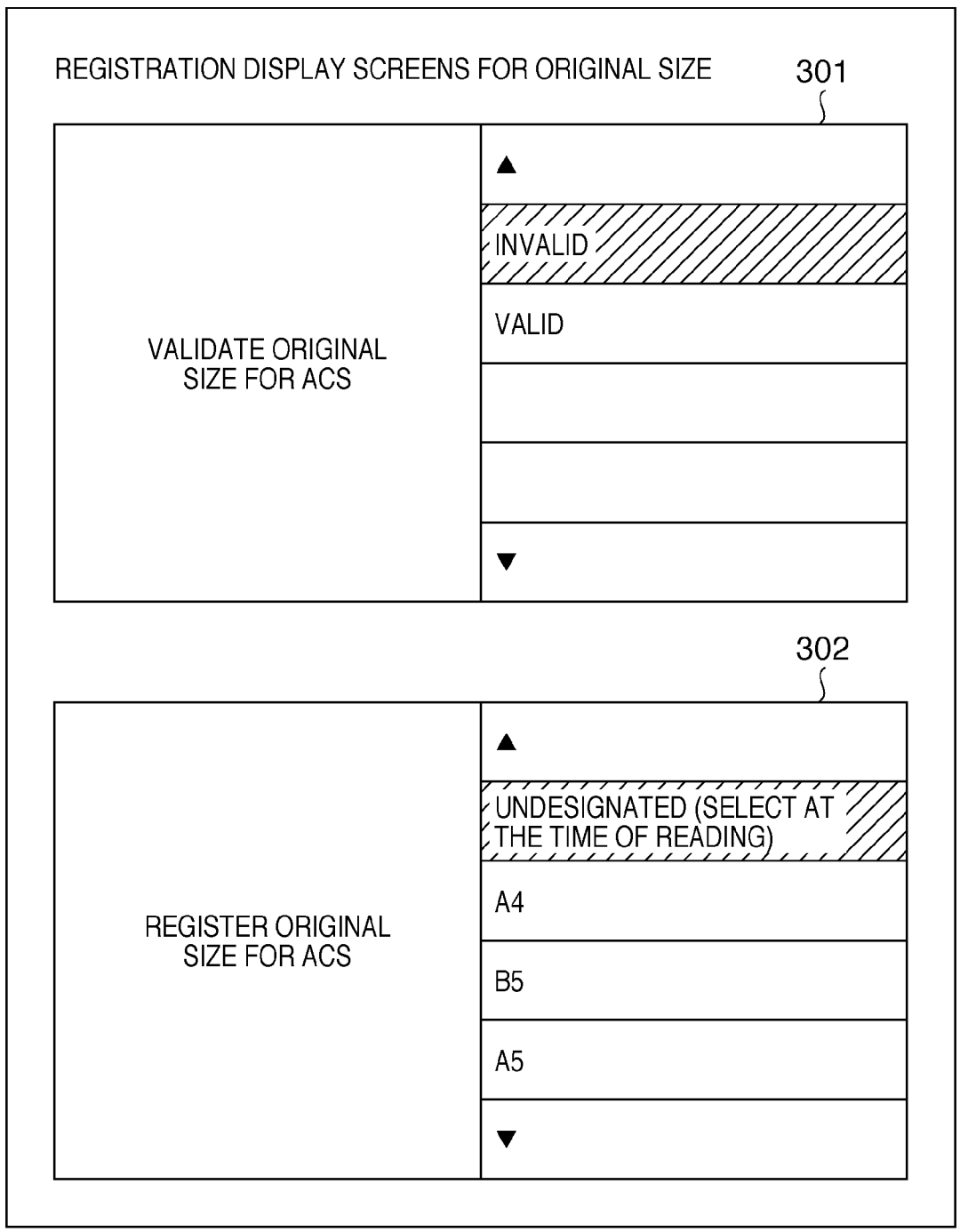
FIG. 3 is a diagram showing registration display screens for an original size according to the first embodiment.
Figure 4:
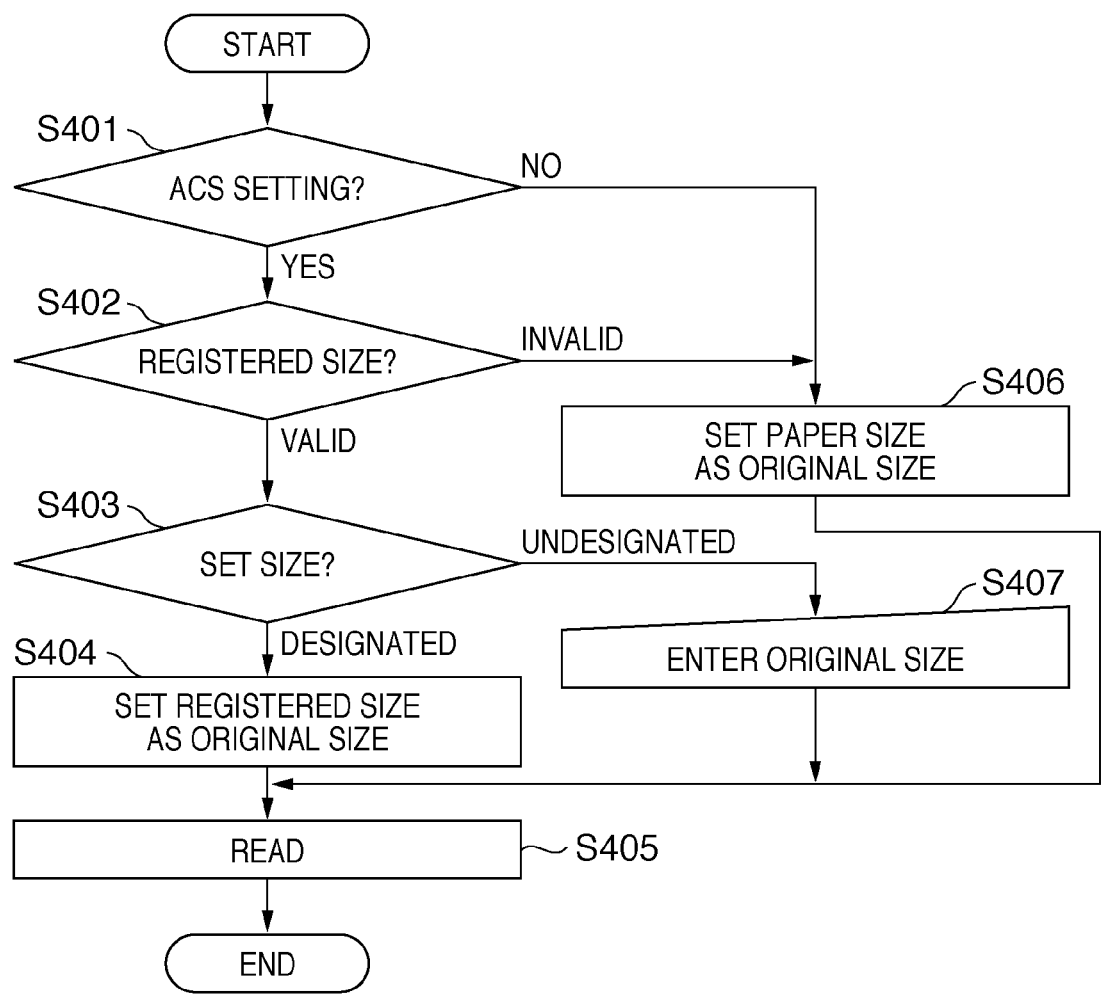
FIG. 4 is a flowchart showing a processing procedure in reading an original according to the first embodiment.

Next, a control flow in reading an original according to this embodiment will be described with reference to FIGS. 3 and 4. FIG. 3 is a diagram showing registration display screens for an original size according to the first embodiment. FIG. 4 is a flowchart showing a processing procedure in reading an original according to the first embodiment. The processing to be described below is performed by the CPU 180 loading an execution program stored in the ROM 95 into the main memory 100 and executing it. Here, a processing procedure up to performing the reading after the original is set at a predetermined location and an operator of the image forming apparatus (hereinafter referred to as a user) gives the instruction for the start of copying will be described.

First, in step S401, the CPU 180 determines whether or not an ACS setting is designated in the executing conditions set by the user. The ACS setting refers to a setting of executing a color determination process in which the image forming apparatus 200 automatically determines whether an original to be read is a monochrome image or a color image, and controlling reading and image forming according to the determination result. Besides the ACS setting, there are a monochrome setting and a color setting. The monochrome setting is a setting for controlling reading and image forming in monochrome without executing the above color determination. The color setting is a setting for controlling reading and image forming in color without executing the above color determination. The user selects among these settings via a user interface before instructing to start the copying. The ACS is executed based on image data in an actually scanned area. Exemplary executing conditions in this embodiment include whether or not to execute the color determination process at the time of reading, and a registered original size and paper size.

If it is determined in step S401 that the ACS setting is not designated, the process proceeds to step S406, where the CPU 180 sets the size of paper (a recording material) used for image printing as the reading size for the original to be read. That is, paper size information about printing paper to be used by default is obtained, and this paper size is automatically set as the reading size. Thereafter, the process proceeds to step S405 to start reading the original. Thus, if the paper used for the copying is of B5 size, even an original of A4 size is scanned across an area of B5 size and image data is generated.

On the other hand, if it is determined in step S401 that the ACS setting is designated, the process proceeds to step S402, where the CPU 180 determines whether or not a registration setting of a pre-registered original size for the ACS is valid. Through a display screen 301 displayed on the LCD 135 shown in FIG. 3, the user can pre-register the validity or invalidity of the original size for the ACS. Data indicating the validity or invalidity is stored in the main memory 100.

If it is determined in step S402 that the registration is invalid, the process proceeds to step S406, where the paper size is set as the reading size for the original as in the case where the ACS setting is not designated. Thereafter, the process proceeds to step S405 to start reading the original.

On the other hand, if it is determined in step S402 that the registration is valid, the process proceeds to step S403, where the CPU 180 confirms the set original size for use in the ACS. This original size is pre-registered through a display screen 302 displayed on the LCD 135 shown in FIG. 3. The LCD 135 is provided with up/down keys, for example, so that the original size can be registered from choices such as "undesignated," A4, B5, and A5. The registered data is stored in the main memory 100. Therefore, the CPU 180 refers to the data stored in the main memory 100 to make the determination in step S403.

If the pre-registered size is "undesignated" in step S403, the process proceeds to step S407, where the CPU 180 creates a display on the LCD 135 prompting the user to enter the original size and causes the user to determine the original size. Thereafter, the entered original size is set as the reading size for the original. The process proceeds to step S405 to start reading the original.

On the other hand, if a specific original size such as A4 is registered in step S403, the process proceeds to step S404. The CPU 180 sets the pre-registered original size as the reading size for the original and starts reading the original in step S405.

Thus, as described above, if an appropriate original size is pre-registered, the image forming apparatus according to this embodiment can reduce erroneous ACS determinations by scanning an appropriate reading area. Even if the user does not pre-register the original size, erroneous ACS determinations can be reduced by setting, as the reading size for the original, the original size entered by causing the user to enter the original size to be used. In this manner, the image forming apparatus according to this embodiment can reduce operations troublesome for the user by requiring, at the time of reading the original, minimum user operations necessary for executing the ACS.

Second Embodiment

Figure 5:
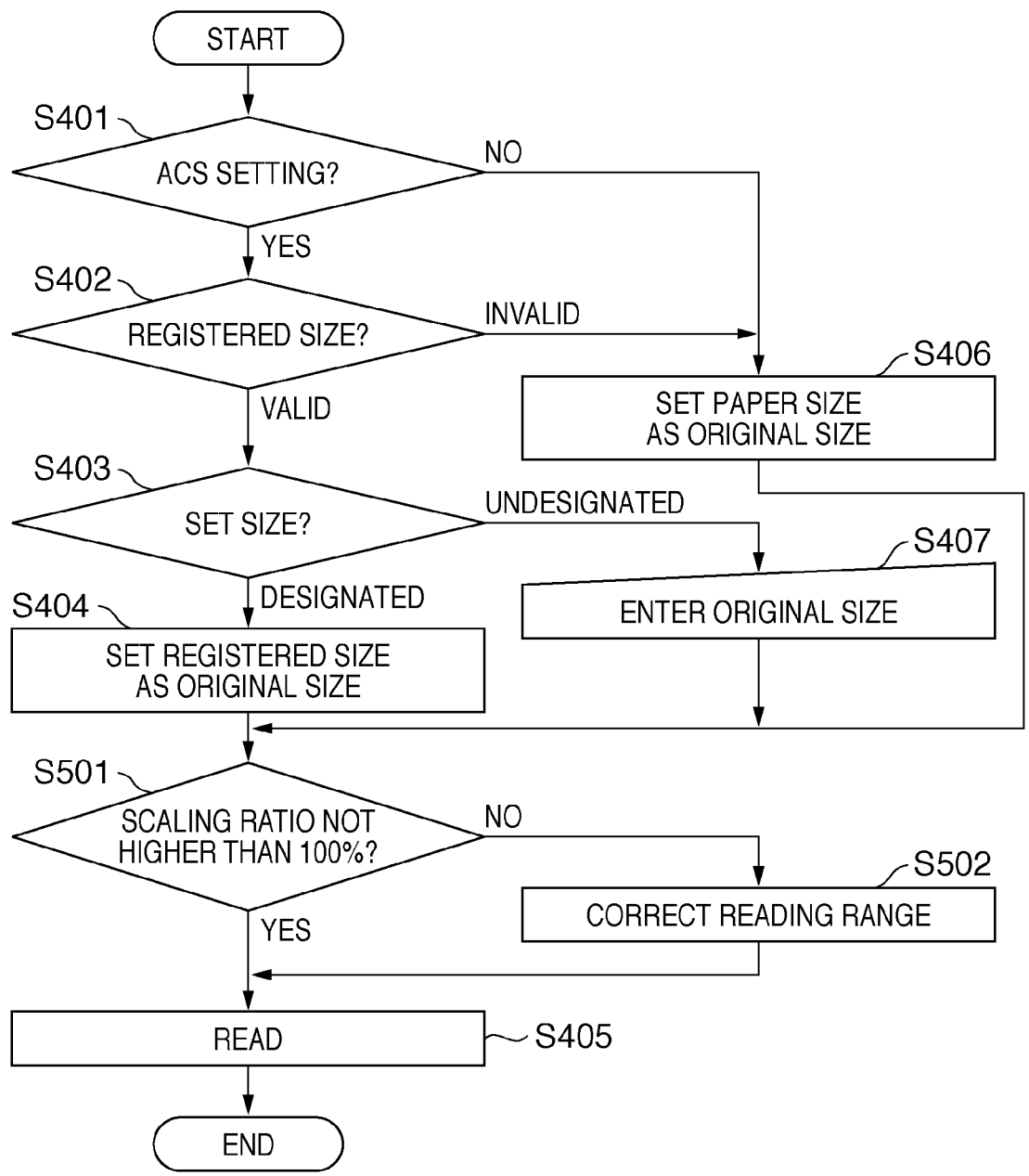
FIG. 5 is a flowchart showing a processing procedure in reading an original according to a second embodiment.

Next, a second embodiment will be described with reference to FIG. 5. The control configuration and the hardware configuration of the image forming apparatus according to this embodiment are the same as those described in FIGS. 1 and 2, and therefore will not be described again. FIG. 5 is a flowchart showing a processing procedure in reading an original according to the second embodiment. The processing to be described below is performed by the CPU 180 loading an execution program stored in the ROM 95 into the main memory 100 and executing it. Here, a processing procedure up to performing the reading after the original is set at a predetermined location and the user instructs the start of copying will be described.

Here, the same process steps as in the flowchart of FIG. 4 are given the same numerals and will not be described again. That is, steps S501 and S502 inserted before step S405 of performing the reading processing for the original will be described below. Exemplary executing conditions in this embodiment include whether or not to execute the color determination process at the time of reading, a registered original size and paper size, and information about the scaling ratio at the time of image forming of read image data.

In step S501, the CPU 180 determines whether or not the scaling ratio for the image at the time of copying included in the executing conditions is not higher than 100%. If the scaling ratio is higher than 100%, the process proceeds to step S502, where the CPU 180 corrects the reading range. Specifically, the CPU 180 corrects the reading size for the original to a value obtained by dividing the original size set in S404, S406, and S407 by the designated scaling ratio. This allows making the ACS determination by taking into account the reading area that is valid at the time of printing. On the other hand, if it is determined in step S501 that the scaling ratio is not higher than 100%, the process directly proceeds to step S405 to cause the reading of the original to be started.

Thus, as described above, if the designated scaling ratio at the time of image forming of the read image data is higher than 100%, the image forming apparatus according to this embodiment corrects the reading size to a value obtained by dividing the reading size by the scaling ratio. Therefore, the image forming apparatus can read the original with an appropriate reading size depending on the scaling ratio, thereby improving the reading control.

Third Embodiment

Figure 6:
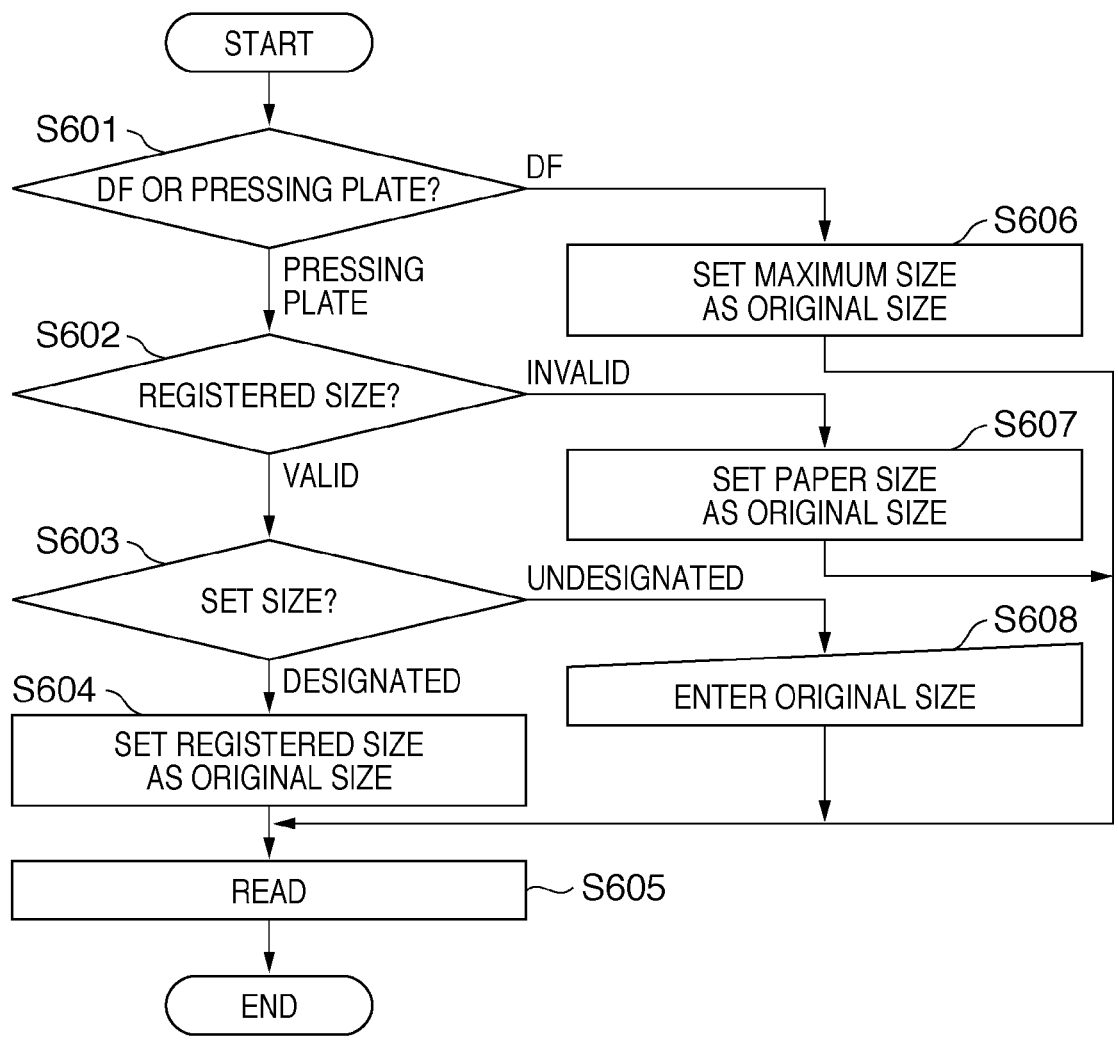
FIG. 6 is a flowchart showing a processing procedure in reading an original according to a third embodiment.

Next, a third embodiment will be described with reference to FIG. 6. The control configuration and the hardware configuration of the image forming apparatus according to this embodiment are the same as those described in FIGS. 1 and 2, and therefore will not be described again. FIG. 6 is a flowchart showing a processing procedure in reading an original according to the third embodiment. The processing to be described below is performed by the CPU 180 loading an execution program stored in the ROM 95 into the main memory 100 and executing it. Here, a processing procedure up to performing the reading after the original is set at a predetermined location and the user instructs the start of copying will be described. It is to be noted that the description here is about control in the case where the ACS setting is not designated, that is, the monochrome setting or the color setting is designated. Exemplary executing conditions in this embodiment include whether or not to execute the color determination process at the time of reading, and a registered original size and paper size.

In step S601, the CPU 180 determines whether the original is on a DF or under a pressing plate. The DF (document feeder) corresponds to the feeding unit shown in FIG. 2. The pressing plate presses an original placed on the original platen shown in FIG. 2. The feeding unit has an original detection sensor and can determine through the motor control unit 110 whether or not an original is set on the feeding unit. Therefore, if the original is not set on the feeding unit, the CPU 180 determines that the original is placed under the pressing plate, that is, on the original platen.

If it is determined in step S601 that the original is set on the DF, the process proceeds to step S606, where the CPU 180 sets the maximum size readable by the image forming apparatus 200 as the reading size for the original. Thereafter, in step S605, the CPU 180 causes the reading of the original to be started. In this case, the CPU 180 identifies the actual original size from the length of the read original. The printer image processing unit 30 trims image data based on the identified original size and sends the image data to the LBP 45 via the LBP interface 40.

On the other hand, if it is determined in step S601 that the original is placed under the pressing plate, the process proceeds to step S602, where the CPU 180 determines whether a pre-registered original size is valid or invalid as in step S402. Again, an original size for the case where the ACS setting is not designated can be registered in a similar manner through an operation screen like the display screen 302. The registered data is stored in the main memory 100.

If it is determined in step S602 that the setting is invalid, the process proceeds to step S607. The CPU 180 sets the paper size used in image printing as the reading size for the original and causes the reading of the original to be started in step S605. On the other hand, if it is determined in step S602 that the setting is valid, the process proceeds to step S603.

In step S603, the CPU 180 determines whether the original size is registered as in step S403. If the pre-registered original size is "undesignated," the CPU 180 creates a display on the LCD 135 prompting the user to enter the original size and causes the user to set the original size in step S608. Thereafter, in step S605, the CPU 180 causes the reading of the original to be started with the set original size.

On the other hand, if the pre-registered original size is a specific original size in step S603, the process proceeds to step S604, where the CPU 180 sets the pre-registered original size as the reading size for the original. Further, in step S605, the CPU 180 causes the reading of the original to be started.

Thus, as described above, if the original is set on the DF, the image forming apparatus according to this embodiment sets the maximum size readable by the image forming apparatus 200 as the reading size. Further, if the original is placed under the pressing plate, the image forming apparatus performs the same setting processing as in the case where the ACS processing is designated in the first and second embodiments. In this manner, by prompting the user to enter the original size as necessary, the image forming apparatus allows accurate reading processing to be performed without imposing a burden on the user.

Fourth Embodiment

Figure 7:
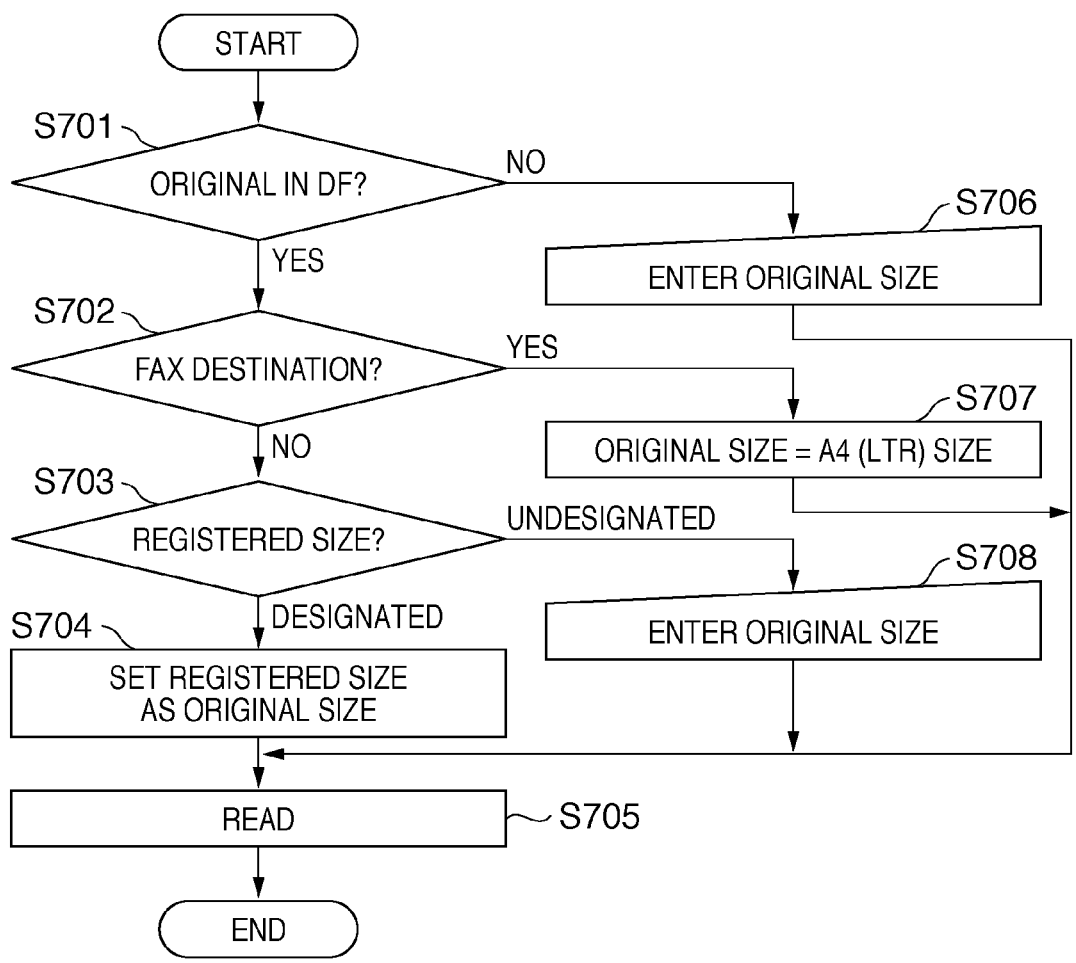
FIG. 7 is a flowchart showing a processing procedure in reading an original according to a fourth embodiment.
Figure 8:
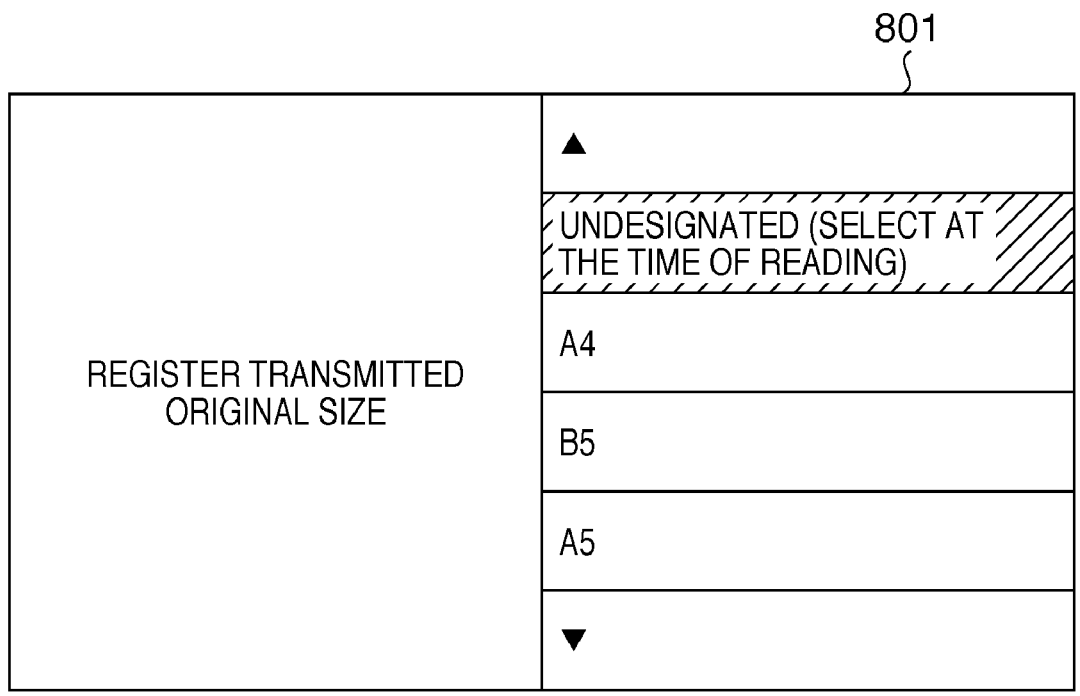
FIG. 8 is a diagram showing a registration display screen for an original size according to the fourth embodiment.

Next, a fourth embodiment will be described with reference to FIGS. 7 and 8. The control configuration and the hardware configuration of the image forming apparatus according to this embodiment are the same as those described in FIGS. 1 and 2, and therefore will not be described again. FIG. 7 is a flowchart showing a processing procedure in reading an original according to the fourth embodiment. FIG. 8 is a diagram showing a registration display screen for an original size according to the fourth embodiment. The processing to be described below is performed by the CPU 180 loading an execution program stored in the ROM 95 into the main memory 100 and executing it. Here, a processing procedure up to performing the reading after the original is set at a predetermined location and the user gives the instruction for the start of copying will be described. It is to be noted that the description here is about control of determining the reading size for the original at the time of generating image data to be transmitted in fax or e-mail transmission via a modem 93 or the interface units 170. Exemplary executing conditions in this embodiment include whether or not to execute the color determination process at the time of reading, a registered original size and paper size, and information about the destination of the read image data. It is assumed that the A4 size is used as a defined original size for facsimile transmission in this embodiment.

In step S701, the CPU 180 determines whether or not the original is on the DF. The specific determination method is the same as in step S601, where the original detection sensor is used to make the determination. If it is determined that the original is not present, the process proceeds to step S706, where the CPU 180 creates a display on the LCD 135 prompting the user to enter the original size and causes the user to enter the original size. Thereafter, in step S705, the CPU 180 causes the reading of the original to be started with the entered original size.

On the other hand, if it is determined in step S701 that the original is on the DF, the CPU 180 determines whether or not the destination is a fax in step S702. If the destination is a fax, in step S707, the CPU 180 sets, as the reading size for the original, the defined original size for facsimile transmission of 1728 pixels, A4 width, and LTR width. Thereafter, in step S705, the CPU 180 causes the reading of the original to be started with the set original size.

On the other hand, if it is determined in step S702 that the destination is not a fax, the CPU 180 determines in step S703 whether or not an original size is pre-registered. If an original size is registered, the CPU 180 sets the original size as the reading size for the original in step S704. Further, in step S705, the CPU 180 causes the reading of the original to be started with the set reading size.

On the other hand, if it is determined in step S703 that no original size is registered, the CPU 180 causes the user to enter an original size in step S708. Thereafter, in step S705, the CPU 180 causes the reading of the original to be started with the entered original size.

A display screen 801 shown in FIG. 8 illustrates a screen displayed on the LCD 135 for registering the transmitted original size used in the determination in step S703. If "undesignated (select at the time of reading)" is selected, it is determined in step S703 that no original size is registered. If an original size such as "A4" or "B5" is registered, the registered original size is set as the reading size for the original.

Thus, as described above, if the read original is to be transmitted to a facsimile machine, the image forming apparatus according to this embodiment sets the size specific to facsimile transmission as the reading size. Further, if the read image data is to be transmitted in a manner other than facsimile transmission, the image forming apparatus prompts the user to enter the original size as necessary. This allows accurate reading processing to be performed without imposing a burden on the user. It is to be noted that the image forming apparatus in this embodiment does not necessarily require an image printing function. This embodiment may be applied to an apparatus having an image reading function and an image transmission function.

Other Embodiments

Thus, objects of the present invention may also be achieved in such a manner that a storage medium having recorded thereon a program code of software implementing the functions of the above-described embodiments is supplied to a system or apparatus, and a computer (such as a CPU or MPU) of the system or apparatus reads out and executes the stored program code.

In this case, the program code itself read out from the storage medium implements novel features of the present invention, and the storage medium having the program code stored thereon constitutes the present invention.

Therefore, the program may take any form such as an object code, a program executed by an interpreter, or script data supplied to an OS (operating system), as long as it has program functions.

The storage medium for supplying the program may be a flexible disk, hard disk, optical disk, magneto-optical disk, MO, CD-ROM, CD-R, or CD-RW, for example. The storage medium may also be a magnetic tape, nonvolatile memory card, ROM, DVD, or the like.

In this case, the program code itself read out from the storage medium implements the functions of the above-described embodiments, and the storage medium having the program code stored thereon constitutes the present invention.

Alternatively, the program may be supplied by connecting to a website on the Internet via a browser on a client computer and downloading the computer program of the present invention from the website to a recording medium such as an HDD. The program may also be supplied by downloading a compressed file with an automatic installing function to a recording medium such as a hard disk. The present invention may also be realized by dividing the program code that constitutes the program of the present invention into a plurality of files and by downloading different files from different websites. That is, the claims of the present invention also include a WWW server, an ftp server, and the like that allow a plurality of operators to download the program files for implementing the functional processing of the present invention in a computer.

The program of the present invention may also be stored in encrypted form in storage media such as CD-ROMs and distributed to operators. In this case, an operator who satisfies predetermined conditions may be allowed to download decryption key information from a website over the Internet. The operator may use the key information to execute the encrypted program and install the program to a computer, thereby realizing the present invention.

Besides the computer executing the read-out program code, an OS or the like running on the computer may perform part or all of actual processing under instructions of the program code to realize the present invention.

Further, the program code read out from the storage medium may be written to memory provided in a function extension board inserted into the computer or in a function extension unit connected to the computer. In this case, a CPU or the like provided in the function extension board or function extension unit may perform part or all of actual processing under instructions of the program code to realize the present invention.

The present invention may be applied to a system composed of a plurality of devices, or to an apparatus implemented as a single device. It is to be understood that the present invention may also be adapted to a case where the present invention is achieved by supplying a program to the system or apparatus. In this case, a storage medium having stored thereon a program represented by software for achieving the present invention may be read out into the system or apparatus, and the system or apparatus can thereby enjoy the advantages of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-158554 filed on Jun. 17, 2008, which is hereby incorporated by reference herein in its entirety.

What is claimed is:

1. An image forming apparatus comprising a reading unit that reads an original and a color determination unit that executes a color determination process for determining whether the original is monochrome or color from read data, the image forming apparatus comprising:
   a registration unit that registers an executing condition for reading the original;
   a confirmation unit that confirms the executing condition; and
   a setting unit that sets a registered original size as a reading size for reading the original if the executing condition confirmed by said confirmation unit designates execution of the color determination process and an original size is registered, and sets a size of a printing material used for image printing as the reading size if the executing condition designates the execution of the color determination process and the original size is not registered, or if the executing condition does not designate the execution of the color determination process.

2. The image forming apparatus according to claim 1, wherein
   said setting unit prompts an operator to enter the original size and sets the entered original size as the reading size if the executing condition designates the execution of the color determination process and the original size is registered, and if the original size is registered as undesignated.

3. The image forming apparatus according to claim 1, wherein
   the executing condition comprises a scaling ratio for image forming, and
   the image forming apparatus further comprises a correction unit that corrects the reading size set by said setting unit to a value obtained by dividing the reading size by a designated scaling ratio if a scaling ratio higher than 100% is designated in the executing condition.

4. The image forming apparatus according to claim 1, further comprising:
   a feeding unit that feeds an original;
   an original platen on which an original is placed; and
   an original detection sensor that detects the presence or absence of an original set on said feeding unit, wherein
   said setting unit sets a maximum original size readable by the image forming apparatus as the reading size if the executing condition does not designate the execution of the color determination process and the original is set on said feeding unit, and executes the same setting processing as in the case where the execution of the color determination process is designated if the executing condition does not designate the execution of the color determination process and the original is placed on said original platen.

5. The image forming apparatus according to claim 4, wherein
   said setting unit determines that the original is placed on said original platen if said original detection sensor cannot detect the original set on said feeding unit.

6. A control method for an image forming apparatus comprising a reading unit that reads an original and a color determination unit that executes a color determination process for determining whether the original is monochrome or color from read data, the method comprising:
   registering an executing condition for reading the original;
   confirming the executing condition; and
   setting a registered original size as a reading size for reading the original if the executing condition confirmed in said confirming designates execution of the color determination process and an original size is registered, and setting a size of a printing material used for image printing as the reading size if the executing condition designates the execution of the color determination process and the original size is not registered, or if the executing condition does not designate the execution of the color determination process.

7. A non-transitory computer-readable storage medium storing a computer program that causes a computer to perform the steps of the control method according to claim 6.

* * * * *